United States Patent [19]
Bowen et al.

[11] Patent Number: 5,358,454
[45] Date of Patent: Oct. 25, 1994

[54] TEMPERATURE AND PRESSURE COMPENSATED GEARED TRACTION UNIT

[75] Inventors: Thomas Bowen, Thousand Oaks, Calif.; Barry L. Frost, Waterford, Mich.

[73] Assignee: New Venture Gear, Inc., Troy, Mich.

[21] Appl. No.: 148,461

[22] Filed: Nov. 5, 1993

Related U.S. Application Data

[63] Continuation-in-part of Ser. No. 76,008, Jun. 11, 1993.

[51] Int. Cl.[5] ............................................. F16H 3/74
[52] U.S. Cl. ........................................ 475/94; 475/91; 192/4 R
[58] Field of Search ............... 475/85, 91, 94, 108, 475/112, 254; 192/4 R, 4 B, 112

[56] References Cited

U.S. PATENT DOCUMENTS

| | | | |
|---|---|---|---|
| 2,603,111 | 7/1952 | Madsen | 475/91 |
| 2,743,628 | 5/1956 | Scharaffa | 475/91 |
| 3,371,759 | 3/1968 | Sapolsky | 192/85 R |
| 3,448,637 | 6/1969 | O'Hara | 475/112 |
| 4,084,654 | 4/1978 | Dudek . | |
| 4,389,908 | 6/1993 | Dudek . | |
| 4,472,984 | 9/1984 | Cook . | |
| 4,882,950 | 11/1989 | Gansrab et al. . | |
| 4,916,973 | 4/1990 | Fuelberth et al. . | |
| 5,042,630 | 8/1991 | Hutchison | 475/91 X |
| 5,078,246 | 1/1992 | Rohs et al. | 475/94 X |

OTHER PUBLICATIONS

"PDS (Porsche Dynamic Slip Control Clutch)-A New Inter-Axle Coupling Device for 4WD-Cars", Müller and Witte, SAE Paper No. 880698, Copyright 1988.
"Meshed Planetary Trains Give Gear Limited Slip Differential", Design News, Mar. 22, 1976, pp. 96–97.
TrueTrac Sales Literature, "Torque Proportioning Differential", 1979 Tractech, Inc.

*Primary Examiner*—Edward K. Look
*Assistant Examiner*—Hoang Nguyen
*Attorney, Agent, or Firm*—Harness, Dickey & Pierce

[57] ABSTRACT

A geared torque transfer device is provided having a planetary type gear arrangement disposed within a sealed housing that is filled with a viscous fluid. In operation, rotation of the planet gears within the housing in response to a speed differential between the input and output members causes the viscous fluid to be forcibly pumped through passages formed within the housing. Valves responsive to changes in the operating temperature and/or viscous fluid pressure of the geared traction unit adjust the amount of resistance to the flow of the fluid as it is pumped through the passages. The hydraulic resistance created by pumping the viscous fluid is adapted to resist the free rotation of the device, thereby causing torque to be transferred between the input and output members as a function of the differential speed therebetween.

17 Claims, 5 Drawing Sheets

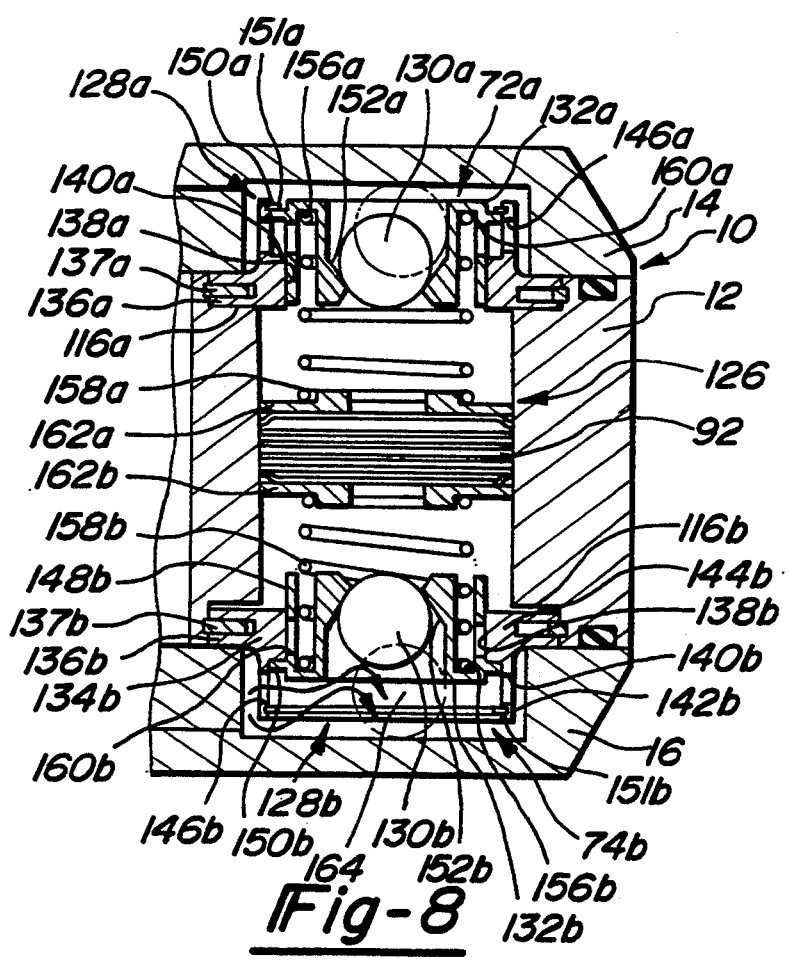

TEMPERATURE AND PRESSURE COMPENSATED GEARED TRACTION UNIT

CROSS-REFERENCE TO RELATED APPLICATIONS

The present application is a continuation-in-part of U.S. patent application Ser. No. 08/076,008, filed Jun. 11, 1993 by Frost and entitled "Geared Traction Unit".

BACKGROUND OF THE INVENTION

The present invention relates generally to power transfer systems for controlling the distribution of drive torque between the front and rear wheels of a four-wheel drive vehicle. More particularly, the present invention is directed to an improved geared coupling that is operable for varying the amount of torque transferred as a function of operating temperature and rotational speed differential applied between an input and an output.

In view of increased consumer popularity in four-wheel drive vehicles, a plethora of power transfer systems are currently being utilized in vehicular driveline applications for directing power (i.e., drive torque) to the non-driven wheels of the vehicle. In "part-time" power transfer systems, a transfer mechanism is incorporated into the driveline which is normally operable in a two-wheel drive mode for delivering drive torque to the driven wheels. In addition, such transfer mechanisms typically include a mechanical "mode" shift mechanism which can be selectively actuated by the vehicle operator for rigidly coupling the non-driven wheels to the driven wheels for establishing a four-wheel drive mode.

Alternatively, it is known to utilize "full-time" power transfer systems for continuously directing drive torque to both sets of wheels. Typically, the transfer mechanism used in such full-time systems is equipped with an inter-axle differential for permitting speed differentiation between the front and rear axles so as to prevent potentially damaging torque build-up in the driveline. In addition, it is also common to provide a "lockout" or brake mechanism (i.e., a differential brake) for selectively or automatically inhibiting such differential action across the inter-axle differential, thereby effectively coupling the front and rear axles in a part-time four-wheel drive mode. In some systems, the lock-out mechanisms must be selectively actuated by the vehicle operator upon the vehicle encountering a low traction road surface. However, some full-time systems are equipped with a viscous coupling or an electronically-controlled clutch mechanism for automatically locking-out the inter-axle differential during certain low traction conditions.

A third type of power transfer system is commonly referred to in the industry as an "on-demand" system. In general, "on-demand" systems are operable to automatically direct power to the non-driven wheels, without any input or action on the part of the vehicle operator, when traction is lost at the driven wheels. Modernly, the "on-demand" feature includes installation of a torque transmission device, such as a viscous coupling or an electronically-controlled clutch assembly, between the driven and non-driven axles. In either case, the amount of drive torque transferred to the non-driven axle is a function of the speed differential (i.e., slip) between the driven and non-driven axles.

As is readily apparent from the foregoing, modern power transfer systems are commonly equipped with some type of multi-plate clutch or coupling apparatus for use as an automatically-controlled differential brake or an on-demand torque transmission device. As will be appreciated, the expense and complexity associated with most electronically-controlled clutch assemblies limits their application to only the most expensive four-wheel drive vehicles. Accordingly, viscous couplings have been widely used in such vehicular applications.

A characteristic of viscous couplings is that as the operating temperature of the viscous coupling increases, due to increases in ambient temperature but primarily due to heating of the viscous fluid as a result of the work imparted on it, the torque transfer characteristics of the viscous coupling changes. However, to improve vehicle handling and driveability, it is desirable to have a torque transmission device which produces a consistent "speed sensitive" increase in torque output over a range of rotational velocity differences and operating temperatures. In this regard, Müller and Witte in their paper *PDS (Porsche Dynamic Slip Control Clutch) - A New Inter-Axle Coupling Device for 4WD - Cars,* SAE Paper No. 880698, describe an "on-demand" coupling device (the PDS device) capable of delivering progressive torque output in response to an increasing speed differential between the driven axle and non-driven axle. In general, the PDS device is essentially a modified dual-sun planetary gear mechanism that is operably associated with a centrifugal brake. The PDS device has an input sun gear coupled for rotation with the driven axle and an output sun gear coupled for rotation with the non-driven axle. Under normal driving conditions when there is little or no difference in the rotational velocity between the axles, the PDS device does not transfer torque to the non-driven wheels. That is, the vehicle is operating in a two-wheel drive mode. However, when the driven axle slips causing a difference between the driven and non-driven axle rotational velocities, a planet carrier is caused to rotate at relatively high velocity. However, this rotation is resisted by the centrifugal brake that is coupled to the planet carrier and which is adapted to engage a braking surface fixed to a stationary wall portion of the power transfer device housing. With the planet carrier thus restrained, torque is progressively transferred "on-demand" via the planet gears from the input sun gear to the output sun gear for delivering torque to the non-driven wheels. One disadvantage associated with the PDS device is its use of the centrifugal brake to control the torque transfer. More specifically, by incorporating a centrifugal brake the PDS device requires modification to the power transfer device housing, the introduction of additional parts and assembly steps to the power transfer device, and the potential for increased maintenance when the centrifugal brake friction elements begin to wear. An additional disadvantage of the centrifugal brake is that in reacting the torque into the housing, the PDS device is generally incompatible with anti-lock braking systems (ABS).

SUMMARY OF THE INVENTION

Accordingly, the present invention is directed to an improved torque transfer device which provides a temperature compensated, "speed sensitive" torque output in a compact device. The torque transfer device of the present invention is readily adaptable to existing power transfer mechanisms or is directly substitutable in power transfer mechanisms presently using viscous couplings. As a related object, the improved torque transfer device of the present invention is adapted for use as either a differential brake for an inter-axle differential or as an "on-demand" torque transmission device that is compatible with ABS.

As still another object of the invention, the torque transfer device is adapted to provide temperature and viscous fluid pressure compensated, "speed sensitive" torque output.

The improved coupling of the present invention is a geared torque transfer device having a planetary type gear arrangement disposed within a sealed housing that is filled with a viscous fluid. In operation, rotation of the planet gears within the housing in response to a speed differential between the input and output members causes the viscous fluid to be forcibly pumped through passages formed within the housing. Valves responsive to changes in the operating temperature and/or viscous fluid pressure of the geared traction unit adjust the amount of resistance to the flow of the fluid as it is pumped through the passages. The hydraulic resistance created by pumping the viscous fluid is adapted to resist the free rotation of the device, thereby causing torque to be transferred between the input and output members as a function of the differential speed therebetween.

BRIEF DESCRIPTION OF THE DRAWINGS

Further objects, features and advantages of the present invention will be apparent from studying the following written description and the appended claims, taken in conjunction with the accompanying drawings in which:

FIG. 8 is a view similar to FIG. 6 showing the temperature compensating valve assembly at a high temperature.

DETAILED DESCRIPTION OF THE INVENTION

In general, the present invention is directed to providing a temperature and pressure controlled geared torque transfer device for use in motor vehicles, and particularly, in four-wheel drive applications as an inter-axle differential brake or an "on demand" torque transmission device. In either case, the geared torque transfer device of the present invention is adapted to instantaneously and automatically improve the tractive characteristics of the four-wheel drive vehicle in response to a loss of traction. It should be understood from the outset, however, that the invention is not so limited and those skilled in the art will appreciate that its teachings can be used in a much broader spectrum of vehicular applications (i.e., intra-axle differential) than those expressed herein.

Figure 3:
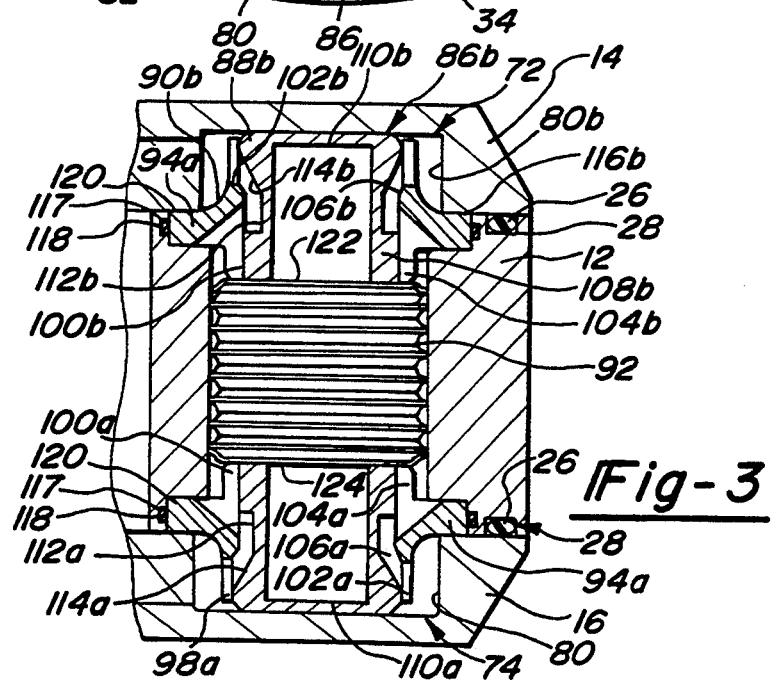
FIG. 3 is sectional view of the geared coupling unit taken along line 3—3 of FIG. 2 showing the valve position when the geared coupling unit is at a low operating temperature.

With particular reference to the drawings, preferred embodiments of the present invention are shown. More particularly, a geared traction unit (GTU) 10, is shown including a housing 12 and end plates 14 and 16. End plates 14 and 16 are aligned to housing 12 by bolts 18 (only one of which is shown) which engage bores 20 formed in end plate 14, bores 22 formed in housing 12 and threaded bores 24 in end plate 16. Moreover, a seal 26 is disposed in a groove 28 formed in the outer circumference of end plates 14 and 16 for sealing end plates 14 and 16 to housing 12 in a fluid-tight manner (FIG. 3).

Housing 12 is shown to include an enlarged central chamber 30 which communicates with four equally-spaced gear chambers 32. Each gear chamber 32 is separated by a reservoir chamber 34 which generally surround central chamber 30 and are separated therefrom by housing walls 36. An input stub shaft 38 having internal splines 40 and an integral input sun gear 42 is disposed within central chamber 30 and rotatably journalled within a bore 44 formed in end plate 14. Input stub shaft 38 is sealed to end plate 14 by a suitable seal (not shown). Drive torque from a source, such as an internal combustion engine (not shown) and delivered through a multi-speed transmission (not shown), is ultimately transmitted to GTU 10 via external splines 48 on driven shaft 50 engaging input shaft internal splines 40. As will be appreciated, driven shaft 50 is representative of any output shaft, such as the rear output shaft of a transfer case or a power take-off shaft of a front-wheel drive transaxle. To reiterate, GTU 10 is adapted for use in vehicular driveline applications, and primarily four-wheel drive vehicles, for progressively transferring torque from driven shaft to a non-driven shaft in response to the speed differential therebetween.

Input shaft 38 further includes a pilot end portion 52 onto which an output sun gear 54 is rotatably journalled. Output sun gear 54 includes an elongated tubular portion 56 having an outer surface rotatably journalled within a central bore 58 formed in end plate 16 and an inner surface 60 rotatably journalled on pilot portion 52 of input shaft 38. In addition, suitable seals (not shown) are provided for sealing tubular portion 56 to end plate 16 and pilot portion 52 to output sun gear 54, respectively. To provide means for coupling output sun gear 54 to an output or non-driven shaft (not shown), tubular portion 56 of output sun gear 54 is formed with external splines 62 for engaging internal splines formed on such an output shaft. Accordingly, torque can be transmitted to or from the other drive elements of the vehicle (not shown) via the interconnection established between driven shaft 50 and the non-driven shaft. More particularly, sun gears 42 and 54 each mesh with a plurality of planet gears 64 (only one of which is shown) which are formed at each end with a cylindrical stub portion 66 journally supported in needle bearing assemblies 68 pressed into bores 70 formed in end plates 14 and 16. In a preferred embodiment, input sun gear 42 has thirty-two (32) teeth, output sun gear 54 has thirty-six (36) teeth and each planet gear 64 has fourteen (14) teeth. Meshed engagement between planet gears 64 and input sun gear 42 and output sun gear 54 is accounted for by operating planet gears 64 at different pressure angles with respect to each sun gear.

In operation, when there is little or no difference in rotational velocity between the input sun gear 42 and the output sun gear 54, GTU housing 12 rotates as a unit at approximately the same rotational velocity as the input and output shafts and no torque is transferred from the input sun gear 42 to the output sun gear 54. However, when the rotational velocities of input sun gear 42 and output sun gear 54 differ, GTU housing 12 is set into very rapid rotation based upon an approximately 9:1 ratio between the GTU housing 12 and input sun gear 42 and 10:1 ratio between GTU housing 12 and output sun gear 54. Such rotation of GTU 10 in response to a speed differential between input sun gear 42 and output sun gear 54 is resisted by internal fluid pumping action as will be described. Moreover, as planet gears 64 rotate, fluid is pumped within a closed circuit fluid path. This pumping action provides hydraulic resistance to the free rotation of GTU housing 12 and produces a torque reaction and hence a torque transfer between input sun gear 42 and output sun gear 54. The greater the magnitude of the speed differential between input sun gear 42 and output sun gear 54, the greater the rotational velocity of GTU housing 12 and planet gears 64 which, in turn, increases the amount of fluid which is pumped.

As is known in the fluid pumping art, the torque required to pump a viscous fluid is proportional to the mass flow rate and velocity of the fluid being pumped. Thus, as the difference in rotational velocity between input sun gear 42 and output sun gear 54 increases, and likewise the rotational velocity of GTU housing 12 increases, GTU 10 attempts to pump more fluid faster. Pumping more fluid faster requires greater torque input and thus creates greater resistance to rotation of GTU housing 12 and, hence, more torque transfer between input sun gear 42 and output sun gear 54.

Figure 1:
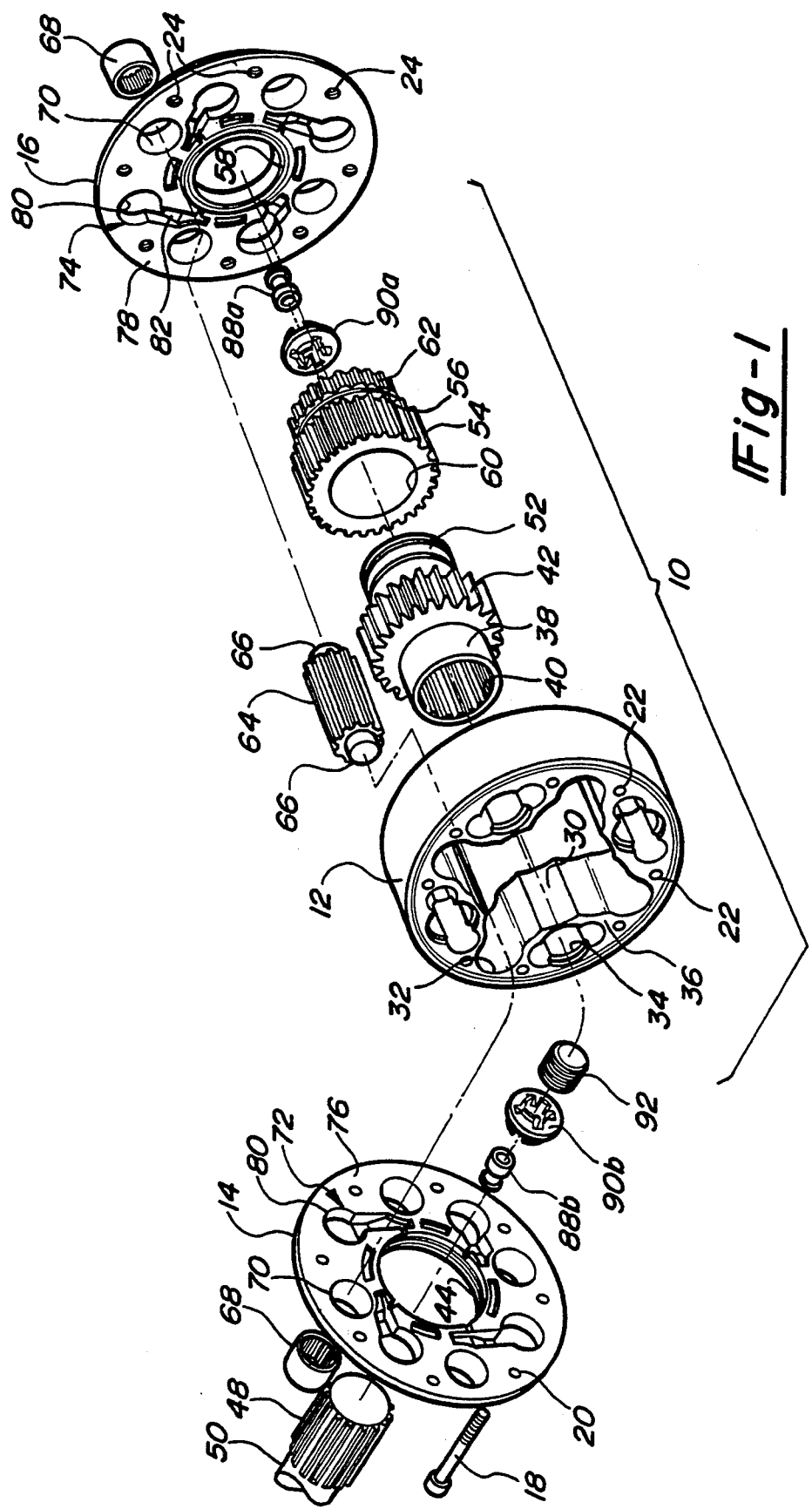
FIG. 1 is a exploded assembly view of the geared coupling unit of the present invention.
Figure 2:
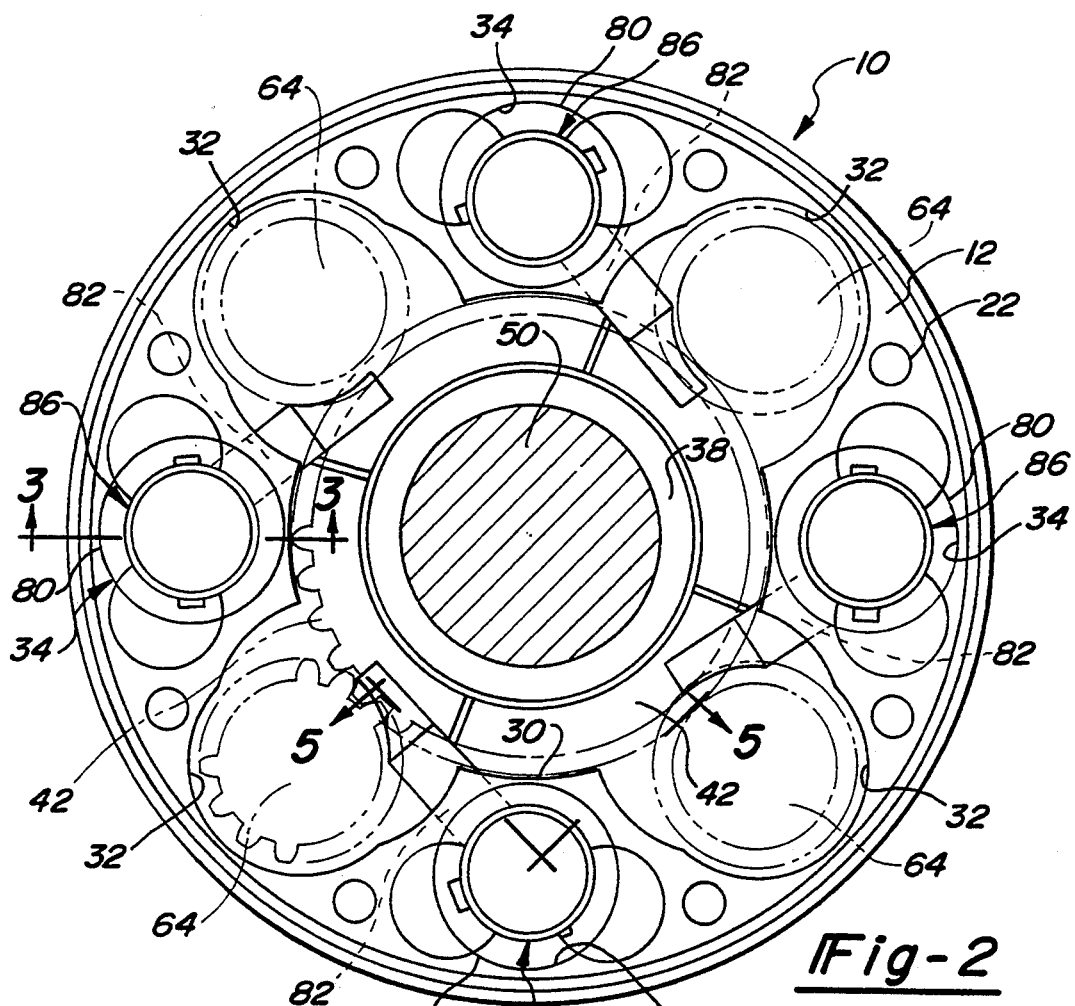
FIG. 2 is a top sectional view of the geared coupling unit of the present invention.
Figure 5:
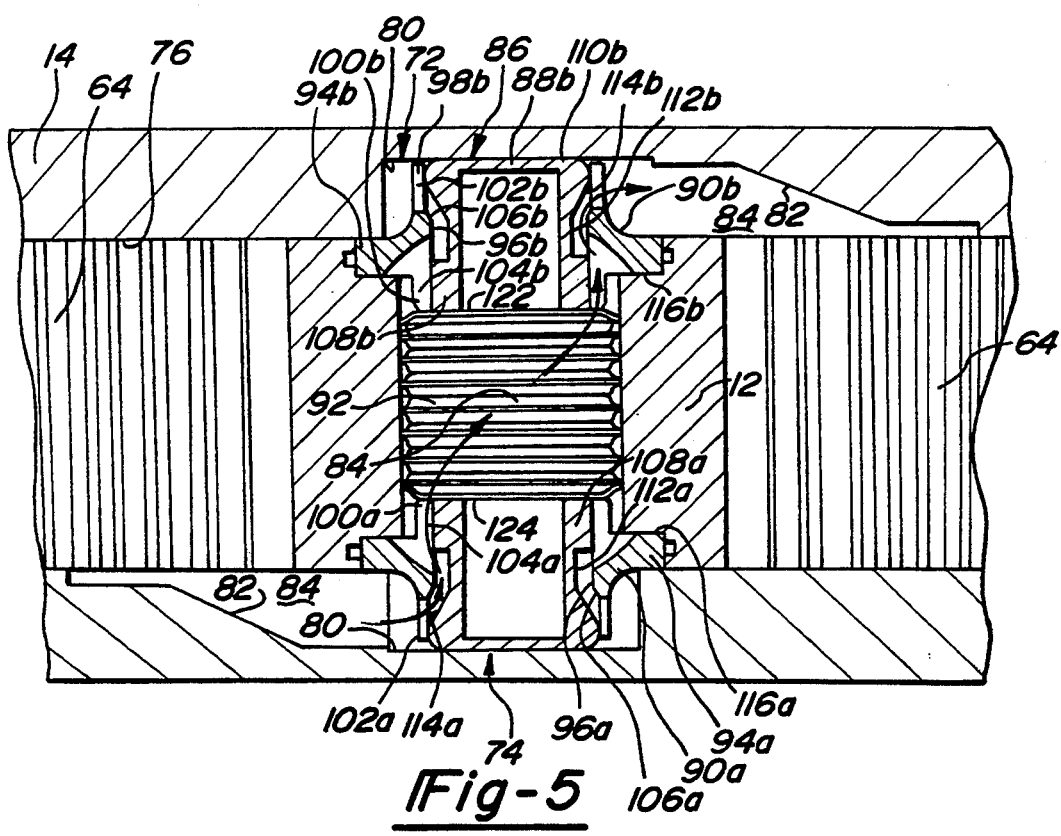
FIG. 5 is a sectional view, taken along line 5—5 of FIG. 2, which illustrates the fluid flow path through the geared coupling unit of the present invention.

With particular reference then to FIGS. 1, 2 and 5, end plates 14 and 16 are shown having a plurality of recesses 72 and 74 formed in inner surfaces 76 and 78, respectively. In particular, each recess 72 and 74 includes a cylindrical pocket 80 and a generally rectangular-shaped trough 82. As best seen in FIG. 2, each trough 82 extends substantially radially outwardly from its cylindrical pocket 80 so as to communicate therewith.

As best seen in FIGS. 2 and 5, bores 20 and 24 formed in end plates 14 and 16, respectively, and bores 22 formed in housing 12 align recesses 72 and 74 adjacent reservoir chambers 34. So aligned, recesses 72 and 74 in conjunction with reservoir chambers 34 and planet gear chambers 32 define a continuous and circuitous fluid flow path within GTU 10. The flow path defined is generally indicated by arrows 84 (FIG. 5) which indicate a direction of fluid flow when the planet gears 64 are caused to rotate in a counter-clockwise fashion based on speed differences between input and output sun gears 42 and 54, respectively. As will be appreciated, clockwise rotation of planet gears 64 would cause fluid flow in a direction opposite that indicated by arrows 84.

Figure 4:
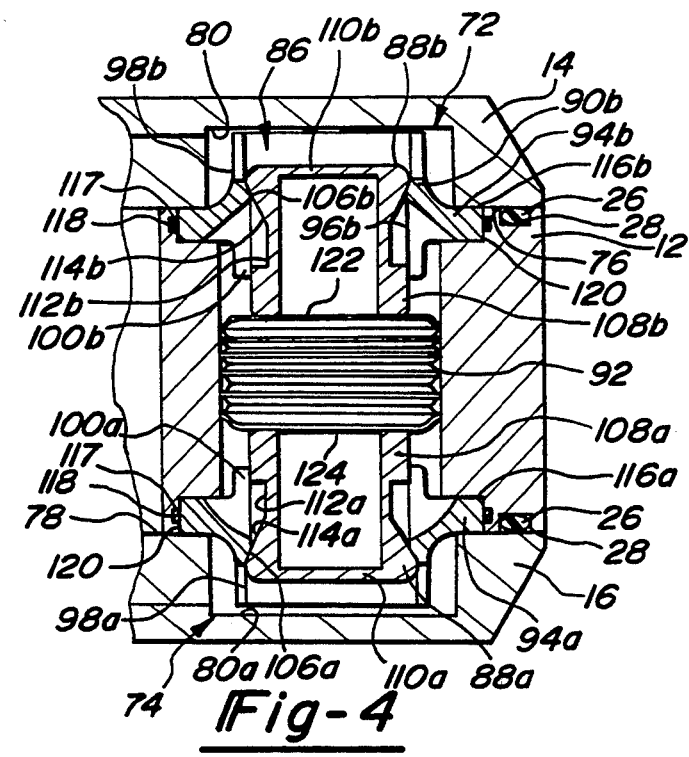
FIG. 4 is a sectional view similar to FIG. 3 showing the valve position when the geared coupling is at a high operating temperature.

With reference now to FIGS. 3-5, disposed within each reservoir chamber 34 is temperature compensating valve assembly 86. Temperature compensating valve assembly 86 includes first and second valves 88a and 88b that are respectively disposed within valve seats 90a and 90b, with valves 88a and 88b being separated by a spring member 92. In general, valves 88a and 88b and valve seats 90a and 90b are identical and oriented in a generally symmetrical relationship with each reservoir chamber 34. Valve seats 90a and 90b are formed with central flanged portions 94a and 94b, axial through bores 96a and 96b and upper and lower ends 98a and 98b and 100a and 100b, respectively. In addition, valve seat upper ends 98a and 98b are formed with a plurality of cut-out sections 102a and 102b, respectively, while valve seat lower ends 100a and 100b are formed with cut-out sections 104a and 104b, respectively. These cut-out sections are provided for allowing fluid flow therethrough as will be described. Moreover, axial through bores 96a and 96b are formed with chamfered seat surfaces 106a and 106b, respectively. Valves 88a and 88b are respectively disposed within axial bores 96a and 96b and are generally cup shaped with side walls 108a and 108b and bottom walls 110a and 110b. The outer surface of side walls 108a and 108b is formed with an under cut surface 112a and 112b for allowing fluid flow and an undercut chamfered surface 114a and 114b for engaging seat surface 106a and 106b.

As can be seen from FIGS. 3-5, reservoir chambers 34 are formed at each end with rabbetted surfaces 116a and 116b onto which valve seats central flanged portion 94a and 94b is received. A seal 117 is disposed in a groove 118 formed in a side portion 120 of rabbetted surfaces 114a and 114b for sealing valve seats 90a and 90b to housing 12 to prevent fluid leakage. Valve seats 90a and 90b are respectively retained on rabbetted surfaces 114a and 114b in an assembled GTU 10 by abutting engagement of end plate inner surfaces 76 and 78 with valve seat central flanged portions 94a and 94b, respectively.

In the presently preferred embodiment, spring member 92 is a hermetically sealed bellows-type spring which is disposed within each reservoir chamber 34 and between valves 88a and 88b. As discussed, GTU 10 is a sealed unit and in operation GTU 10 is filled with a fixed amount of viscous fluid. During operation the pumping action of GTU 10 imparts work onto the viscous fluid resulting in an increase in the fluid temperature and thus an expansion of the fluid volume. However, since the housing 12 of GTU 10 is sealed, the increase in volume of fluid is compensated for by compression of spring members 92. With reference to FIG. 3, a temperature compensating valve assembly 86 of GTU 10 is shown at a low fluid operating temperature, and thus, spring member 92 is shown in an elongated condition. In FIG. 4, temperature compensating valve assembly 86 is shown with the GTU 10 at a higher fluid operating temperature, and thus, spring member 92 is shown in a compressed state due to the expanded volume of the viscous fluid. As can further be seen from FIGS. 3 and 4, valves 88a and 88b are in abutting engagement with an upper and lower surface 122 and 124, respectively, of spring member 92. As will be appreciated, as spring member 92 expands and contracts, valves 88a and 88b are displaced axially within reservoir chamber 34.

It should also be appreciated that spring member 92 need not be of the bellows type. For example, spring member 92 may be constructed from bimetallic material such that it expands and contracts based upon changes in fluid temperature. It should be further appreciated, that spring member 92 may be tuned to respond to changes of fluid pressure due to the pumping action of planet gears 64. Therefore, GTU 10 may be temperature controlled, pressure controlled or both temperature and pressure controlled. If a bimetallic material is used in place of the bellows-type spring for spring member 92, GTU 10 would not have to be sealed. In such an arrangement, the unit may be placed in fluid communication with the lubricating fluid within the vehicle transfer case or other torque transfer device into which the GTU 10 is incorporated for providing fluid to the unit.

With continued reference to FIG. 3, at low operating temperature, spring member 92 is elongated and surfaces 122 and 124 bear against valves 88a and 88b for holding valve chamfered surfaces 114a and 114b away from seat surfaces 104a and 104b, respectively. In this condition, when planet gears are caused to rotate in a counter-clockwise fashion, fluid flows from a first planet gear 64 into trough 82, through passages 102a, around valve 88a via chamfered surface 114a and undercut surface 112a and through passages 104a into reservoir chamber 34, as indicated by arrows 84 in FIG. 5. As stated, the flow path is continuous and circuitous. Thus, under continued counter-clockwise rotation of the planet gears 64, fluid flows from reservoir chamber 34 through passages 104b, undercut surface 112b, chamfered surface 114b and passages 102b to the entry side of the adjacent planet gear 64.

With reference to FIG. 4, at the higher operating temperatures the volume of the viscous fluid within GTU 10 expands and therefore causes spring members 92 to compress. As spring members 92 compress, valve chamfered surfaces 114a and 114b move closer to seat surfaces 104a and 104b. This is due to the fluid pressure within GTU 10 bearing against valve bottom surfaces 110a and 110b and thus pressing valves 88a and 88b against spring member surfaces 122 and 124, depending on the direction of fluid flow. Under some operating conditions, the GTU 10 temperature, and thus the viscous fluid temperature, will become sufficiently high that the fluid volume will expand to cause spring members 92 to compress to the point that valve chamfered surfaces 114a and 114b contact seat surfaces 104a and 104b as shown in FIG. 4. With valve chamfered surfaces 114a and 114b in close proximity of seat surfaces 104a and 104b, fluid flow through temperature compensating valve assembly 86 is reduced. The reduced fluid flow causes an increase in hydraulic resistance to the rotational speed difference of the input and output and likewise an increase in torque transfer between the input and the output as described. Moreover, upon valve chamfered surfaces 114a and 114b contacting seat surfaces 104a and 104b, fluid flow is substantially cutoff and GTU 10 becomes hydraulically locked. In this instance, direct torque transfer between the input and output takes place thus providing an "on-demand" drive state.

As can be appreciated from the foregoing discussion, the torque output characteristics of GTU 10 can be easily modified by simply changing the rate of spring members 92. Thus GTU 10 may be tuned for specific torque transfer applications.

Figure 6:
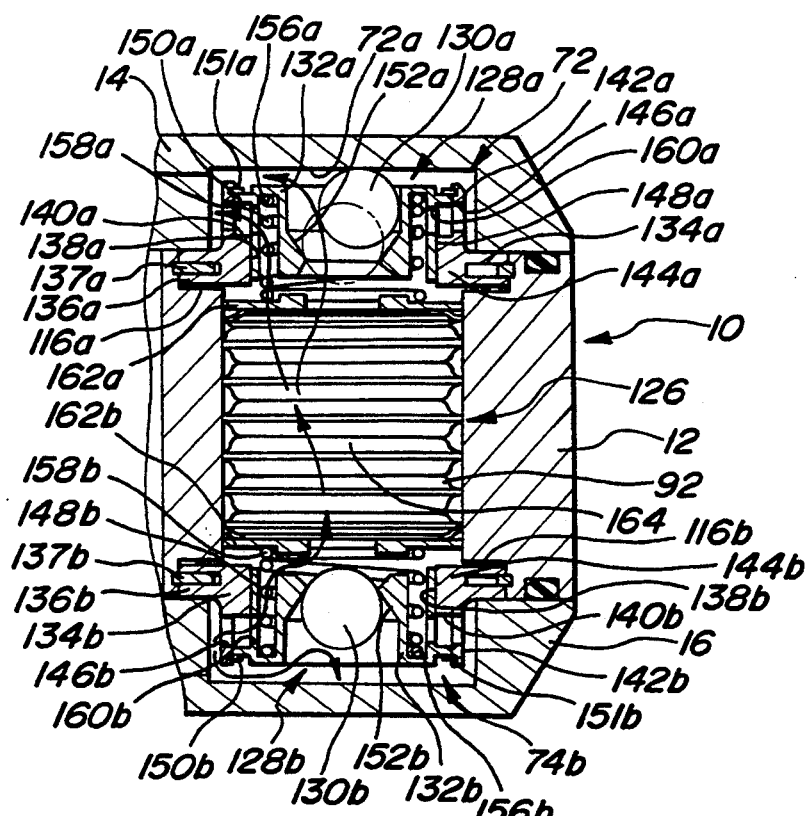
FIG. 6 is a view similar to FIG. 3 showing a second embodiment of the temperature compensating valve assembly of the present invention with the GTU 10 at a low temperature.
Figure 7:
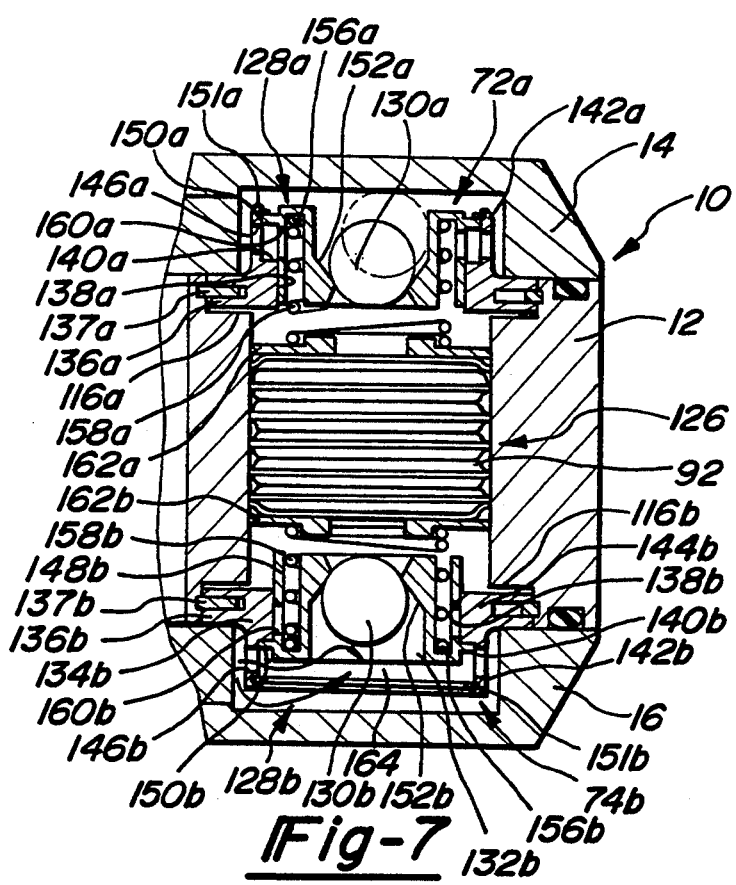
FIG. 7 is a view similar to FIG. 6 showing the temperature compensating valve assembly at a nominal temperature.

As previously mentioned, GTU 10 may be temperature controlled, pressure controlled or both temperature and pressure controlled. With reference to FIGS. 6-8 a second embodiment of the GTU 10 incorporating a temperature/pressure compensating valve assembly 126 is shown in various operating modes. For the sake of clarity, like reference numerals are used to identify like elements of the preceding embodiment. Temperature/pressure compensating valve 126 is operable to restrict free flow of the viscous fluid disposed within GTU 10 in response to changes in both temperature and pressure.

As can be seen in FIGS. 6-8, temperature/pressure compensating valve 126 includes first and second valve assemblies 128a and 128b which include valve balls 130a and 130b which are respectively disposed in valve members 132a and 132b which are slidably received in valve seats 134a and 134b. In general, valve assemblies 128a and 128b are identical and oriented in a generally symmetrical relationship within each reservoir chamber 34. Valve seats 134a and 134b are formed with central flanged portions 136a and 136b which are retained to rabbetted surfaces 116a and 116b by retainers 137a and 137b, stepped axial bores 138a and 138b formed with integrated shoulder portions 140a and 140b, and upper and lower ends 142a and 142b and 144a and 144b, respectively. In addition, valve retainer upper ends 142a and 142b are formed with a plurality of cut-out sections 146a and 146b, respectively for allowing fluid flow therethrough.

Valve members 132a and 132b are formed with outer walls 148a and 148b slidably disposed within the narrow portion of stepped bores 138a and 138b, respectively, and further include radially outwardly extending flange portions 150a and 150b disposed within the widened portion of stepped bores 138a and 138b adjacent shoulder portions 140a and 140b. Valve members 132a and 132b further include centrally located axial tapered bores 152a and 152b against which valve balls 130a and 130b settle. In addition, valve members 132a and 132b are formed with annular channels 156a and 156b for receiving spring members 158a and 158b, respectively, and a plurality of cut-outs 160a and 160b for allowing fluid flow through outer walls 148a and 148b adjacent annular channels 156a and 156b.

Spring members 158a and 158b, under various operating conditions, as will be explained, bear against valve members 132a and 132b and against spring seats 162a and 162b slidably disposed within reservoir chamber and adjacent spring member 92. As shown in FIGS. 6-8, spring member 92 bears against spring seats 162a and 162b, spring members 158a and 158b and valve members 132a and 132b thus causing them to be displaced axially outwardly with respect to reservoir chamber 34 and towards end plates 14 and 16, respectively. Valve members 132a and 132b are prevented from extending axially outwardly into contact with end plates 14 and 16 by retainers 151a and 151b. As explained, during operation, rotational differences between the input sun gear 42 and output sun gear 54 cause a rapid rotation of GTU 10 and fluid to be pumped by sun gears 42 and 54 and planet gears 64 within the closed circuitous path defined within housing 12, and end plates 14 and 16. For example, for counter-clockwise rotation of planet gears 64, fluid is pumped through GTU 10 as generally indicated by arrows 164 in FIG. 6. As can be seen in FIG. 6, fluid flows from recess 72 through cut-outs 146b and 160b into annular channels 156b. From annular channel 156b, fluid easily flows around spring members 158b, 92 and 158a to annular channel 156a. From annular channel 156a, fluid flows through cut-outs 160a and 146a to recess 72 and onto the next planet gear. In addition, under counter-clockwise rotation of planet gears 64, fluid may flow through taper bore 152a because of the pressure of the fluid flow displacing valve ball 130a away from tapered bore 152a. In contrast, fluid may not flow through tapered bore 152b, as the pressure of the fluid flow presses valve ball 130b against tapered bore 152b. Moreover, under increased pressure of fluid flow, pressure bearing against valve ball 130b and spring seat 132b, causes compression of spring member 158b and axial displacement of spring seat 132b inwardly. Such axial displacement of spring seat 132b, causes an eclipsing of cut-outs 160b by valve seat 132b and cut-outs 146b by flange 150a and wall 148b thereby reducing fluid flow in response to increased fluid pressure. Reduced fluid flow and increased fluid pressure produces an associated increase in resistance to free rotation of GTU 10, and hence, an increase in torque transfer between the input and output sun gears 42 and 54. As fluid pressure increases still further, the valve seat 132b will contact shoulder portion 140b thereby substantially inhibiting fluid flow. This condition is shown for valves 128b in FIGS. 7 and 8. With fluid flow inhibited, the GTU 10 becomes hydraulically locked, and thus, direct torque transfer between the input and output sun gears 42 and 54 takes place. Such a lock-up feature is particularly advantageous in four-wheel drive applications where it is desirable to allow differentiation between the front and rear driven axle while still providing locked-up, non-differentiated, or "on-demand", four-wheel drive when one of the driven axles experiences a loss of traction. It should be further understood that the direction of fluid flow and operation of valves 128a and 128b is reversed if planet gears 64 are caused to rotate clockwise in response to a rotational differences between input and output sun gears 42 and 54.

Under various operating conditions and in response to changes in operating temperature of GTU 10, spring member 92 contracts or expands as the viscous fluid within GTU 10 contracts or expands as previously discussed. Such contraction and expansion of spring member 92 causes an opposite expansion and contraction of spring members 158a and 158b. For example, as shown in FIG. 6, GTU 10 is at a low operating temperature, and spring member 92 has expanded in response to the contraction of the viscous fluid. The expansion of spring member 92 causes contraction of spring members 158a and 158b (shown contracted in FIG. 6). In contrast, the GTU 10 shown in FIG. 8 is at a high operating temperature and spring member 92 is shown contracted in response to the expansion of the viscous fluid. Spring members 158a and 158b are therefore expanded (shown expanded in FIG. 8). Similarly, shown in FIG. 7, the GTU 10 is at a nominal temperature and spring members 92, 158a and 158b are at a nominal length.

As will be appreciated from the above, the GTU 10 may be made responsive to fluid temperature and pressure changes to modify its torque transfer characteristics. As discussed, fluid pressure acts on valves 128a and 128b for restricting the flow of fluid through GTU 10 and thus changing its torque transfer characteristics. As further explained, changes in temperatures of the viscous fluid within GTU 10 causes a contraction or expansion of spring members 158a and 158b which bear against valves 128a and 128b. As will be appreciated, for springs following the $F=kX$ where $F=$force; $k=$spring constant; and $X$ is displacement, when spring members 158a and 158b are contracted, more fluid pressure is required to cause axial displacement of valve members 132a and 132b than when spring members 158a and 158b are elongated. Thus, it should be understood that the GTU 10 is adapted to provide a modified torque transfer characteristic to compensate for changing operating temperature and internal fluid pressures. For example, as shown in FIG. 6, the GTU 10 is at a low operating temperature. Spring member 92 is elongated and spring members 158a and 158b are contracted. Thus it requires more internal fluid pressure to cause axial displacement of valve members 132a and 132b in order to provide the lock-up condition described. However, since the fluid within GTU 10 will have a higher viscosity at lower temperatures the pumping action of GTU 10 will produce higher pressures. In FIG. 7, the GTU 10 is shown at a nominal operating temperature with spring members 92, 158a and 158b at nominal lengths. Thus less internal fluid pressure is required to cause displacement of valve members 132a and 132b to provide a lock-up condition (valve seat 132b shown in the lock-up position). In FIG. 8, the GTU 10 is shown at a high operating temperature with spring member 92 contracted and spring members 58a and 158b elongated. Thus, still less internal fluid pressure is required to cause displacement of valve members 132a and 132b to provide a lock-up condition (valve seat 132b shown in the lock-up position). However, since the fluid within the GTU 10 will have lower viscosity at a higher temperature, the pumping action of GTU 10 will produce lower internal fluid pressure. Therefore, the GTU 10 of the present invention provides a temperature and pressure compensated torque output characteristic.

A specific embodiment of the invention has been shown and described in detail to illustrate the principles of the present invention. It will be understood that the invention may be embodied in other forms without departing from such principles and the fair scope of the present invention.

What is claimed is:

1. A geared torque transfer device comprising;
   a housing;
   an input sun gear rotatably supported in the housing;
   an output sun gear rotatably supported in the housing;
   a plurality of planet gears rotatably supported in the housing and in mutual engagement with the input and output sun gears;
   a quantity of viscous fluid disposed with the housing;
   means for defining a fluid flow path such that rotation of the planet gears causes the viscous fluid to flow through the fluid flow path; and
   means responsive to the temperature of the viscous fluid for restricting the free flow of fluid through the flow path thereby creating resistance to the rotation of the planet gears and housing in response to differences in rotational velocity of the input and output sun gears whereby torque is transferred between the input and output sun gears.

2. The torque transfer device of claim 1 wherein the input sun gear has a different number of gear teeth than the output sun gear.

3. The torque transfer device of claim 1 wherein the fluid flow path is circuitous.

4. The torque transfer device of claim 1 wherein the flow restriction means comprises valve means.

5. The torque transfer device of claim 4 wherein the flow restriction means further comprises spring means responsive to changes in the temperature of the viscous fluid for operating the valve means.

6. The torque transfer device of claim 5 wherein the valve means is operable to cut off fluid flow when the temperature of the viscous fluid is greater than a predetermined value.

7. A geared torque transfer device comprising;
a housing;
an input sun gear rotatably supported in the housing;
an output sun gear rotatably supported in the housing;
a plurality of planet gears rotatably supported in the housing and in mutual engagement with the input and output sun gears;
a quantity of viscous fluid disposed with the housing;
means for defining a fluid flow path such that rotation of the planet gears causes the viscous fluid to flow through the fluid flow path; and
means responsive to the pressure of the viscous fluid for restricting the free flow of fluid through the flow path thereby creating resistance to the rotation of the planet gears and housing in response to differences in rotational velocity of the input and output sun gears whereby torque is transferred between the input and output sun gears.

8. The torque transfer device of claim 7 wherein the input sun gear has a different number of gear teeth than the output sun gear.

9. The torque transfer device of claim 7 wherein the fluid flow path is circuitous.

10. The torque transfer device of claim 7 wherein the flow restriction means comprises valve means.

11. The torque transfer device of claim 10 wherein the flow restriction means further comprises spring means responsive to changes in the pressure of the viscous fluid for operating the valve means.

12. The torque transfer device of claim 11 wherein the valve means is operable to cut off fluid flow when the pressure of the viscous fluid is greater than a predetermined value.

13. A geared torque transfer device comprising;
a housing;
an input sun gear rotatably supported in the housing;
an output sun gear rotatably supported in the housing;
a plurality of planet gears rotatably supported in the housing and in mutual engagement with the input and output sun gears;
a quantity of viscous fluid disposed with the housing;
means for defining a fluid flow path such that rotation of the planet gears causes the viscous fluid to flow through the fluid flow path; and
means responsive to the temperature and pressure of the viscous fluid for restricting the free flow of fluid through the flow path thereby creating resistance to the rotation of the planet gears and housing in response to differences in rotational velocity of the input and output sun gears whereby torque is transferred between the input and output sun gears.

14. The torque transfer device of claim 13 wherein the flow restriction means comprises valve means.

15. The torque transfer device of claim 14 wherein the flow restriction means further comprises first spring means responsive to changes in the temperature of the viscous fluid and second spring means responsive to changes in the pressure of the viscous fluid for operating the valve means.

16. The torque transfer device of claim 15 wherein the valve means is operable to cut off fluid flow when the temperature of the viscous fluid is greater than a predetermined value.

17. The torque transfer device of claim 15 wherein the valve means is operable to cut off fluid flow when the pressure of the viscous fluid is greater than a predetermined value.

* * * * *